(12) United States Patent
Kim

(10) Patent No.: US 12,387,747 B2
(45) Date of Patent: Aug. 12, 2025

(54) VOICE ACTIVITY DETECTION APPARATUS, LEARNING APPARATUS, AND STORAGE MEDIUM

(71) Applicant: KABUSHIKI KAISHA TOSHIBA, Tokyo (JP)

(72) Inventor: Uihyun Kim, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 223 days.

(21) Appl. No.: 17/820,878

(22) Filed: Aug. 18, 2022

(65) Prior Publication Data
US 2023/0298618 A1    Sep. 21, 2023

(30) Foreign Application Priority Data
Mar. 15, 2022   (JP) ................................. 2022-040292

(51) Int. Cl.
*G10L 25/78* (2013.01)
*G10L 15/02* (2006.01)
*G10L 25/30* (2013.01)

(52) U.S. Cl.
CPC .............. *G10L 25/78* (2013.01); *G10L 15/02* (2013.01); *G10L 25/30* (2013.01)

(58) Field of Classification Search
CPC .......... G10L 25/78; G10L 15/02; G10L 25/30
See application file for complete search history.

(56) References Cited

U.S. PATENT DOCUMENTS

| 5,586,215 A | * | 12/1996 | Stork | .................. G06V 30/248 |
| | | | | 704/243 |
| 11,257,512 B2 | * | 2/2022 | Nesta | ....................... G06N 3/08 |

(Continued)

FOREIGN PATENT DOCUMENTS

| CN | 113113049 A | 7/2021 |
| JP | 2011-59186 A | 3/2011 |

(Continued)

OTHER PUBLICATIONS

I. Ariav, et al, "An End-to-End Multimodal Voice Activity Detection Using WaveNet Encoder and Residual Networks," IEEE J. of Selected Topics in Signal Processing, vol. 13, No. 2, pp. 265-274 (2019).

(Continued)

*Primary Examiner* — Fariba Sirjani
(74) *Attorney, Agent, or Firm* — Finnegan, Henderson, Farabow, Garrett & Dunner, LLP

(57) ABSTRACT

According to one embodiment, a voice activity detection apparatus includes a processing circuit. The processing circuit acquires an acoustic signal and a non-acoustic signal, calculates an acoustic feature based on the acoustic signal, calculates a non-acoustic feature based on the non-acoustic signal, calculates a voice emphasized feature based on the acoustic signal and the non-acoustic signal, calculates a voice existence/non-existence feature on the basis of the acoustic feature and the non-acoustic feature, calculates a voice existence score based on the voice emphasized feature and the voice existence/non-existence feature, detects a voice section and/or a non-voice section based on comparison of the voice existence score with a threshold.

5 Claims, 8 Drawing Sheets

(56) References Cited

U.S. PATENT DOCUMENTS

| | | | |
|---|---|---|---|
| 2006/0224382 A1* | 10/2006 | Taneda | G10L 25/78 |
| | | | 704/E11.003 |
| 2015/0058004 A1* | 2/2015 | Dimitriadis | G10L 25/78 |
| | | | 704/233 |
| 2019/0385636 A1* | 12/2019 | Li | G10L 15/02 |
| 2020/0074997 A1* | 3/2020 | Jankowski, Jr. | G06N 3/045 |
| 2020/0090682 A1* | 3/2020 | Liu | G06N 3/08 |
| 2020/0115002 A1* | 4/2020 | Weagle | B62J 50/225 |
| 2020/0312343 A1* | 10/2020 | Hsiung | G06N 3/048 |
| 2022/0180894 A1* | 6/2022 | Sha | G10L 25/30 |
| 2022/0284921 A1 | 9/2022 | Kim | |
| 2022/0366927 A1* | 11/2022 | Pishehvar | G06N 3/0464 |
| 2023/0162758 A1* | 5/2023 | Borgstrom | G10L 25/24 |
| | | | 704/200 |
| 2023/0223040 A1 | 7/2023 | Kim | |

FOREIGN PATENT DOCUMENTS

| | | |
|---|---|---|
| JP | 2021-162685 A | 10/2021 |
| JP | 2022-135708 A | 9/2022 |
| WO | WO 2020/144857 A1 | 7/2020 |

OTHER PUBLICATIONS

Japan Patent Office, Office Action in JP App. No. 2022-040292, 3 pages, and machine translation, 3 pages (Jan. 7, 2025).

Japan Patent Office, Decision to Grant a Patent in JP App. No. 2022-040292, 3 pages, and machine translation, 2 pages (May 7, 2025).

* cited by examiner

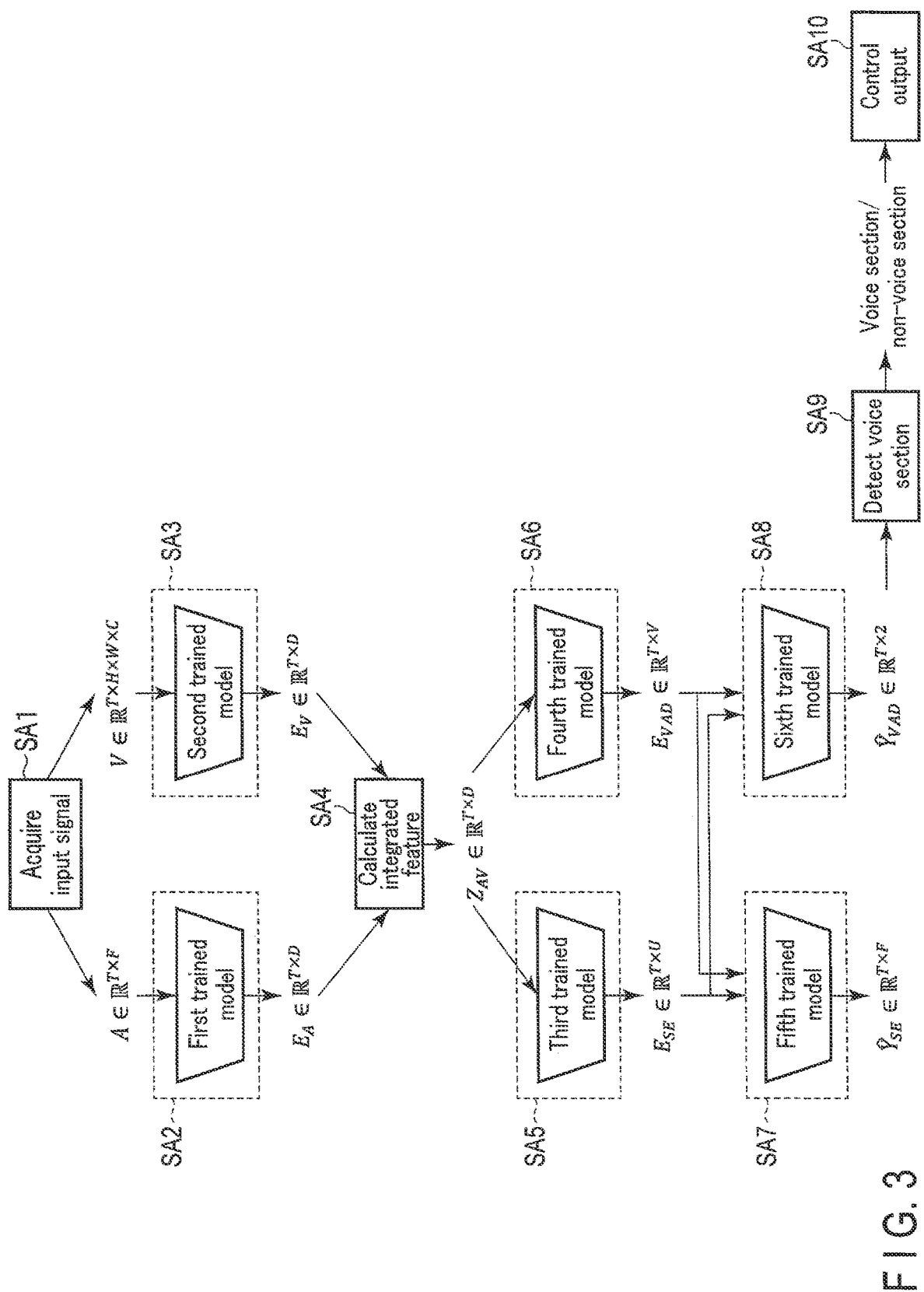
F I G. 3

| Model | Signal-to-noise ratio | | | | | | | |
|---|---|---|---|---|---|---|---|---|
| | 20 dB | 15 dB | 10 dB | 5 dB | 0 dB | -5 dB | -10 dB | Average |
| A-only | 97.50% | 97.55% | 96.66% | 96.24% | 95.18% | 91.49% | 82.06% | 93.81% |
| AV-baseline | 98.06% | 98.04% | 97.96% | 97.73% | 96.23% | 93.38% | 91.55% | 96.14% |
| AV-proposed | 98.99% | 98.98% | 98.88% | 98.77% | 98.43% | 97.45% | 95.52% | 98.15% |

FIG. 8

VOICE ACTIVITY DETECTION APPARATUS, LEARNING APPARATUS, AND STORAGE MEDIUM

CROSS-REFERENCE TO RELATED APPLICATION(S)

This application is based upon and claims the benefit of priority from prior Japanese Patent Application No. 2022-040292, filed Mar. 15, 2022, the entire contents of which are incorporated herein by reference.

FIELD

Embodiments described herein relate generally to a voice activity detection apparatus, a learning apparatus, and a storage medium.

BACKGROUND

Voice activity detection (VAD) is a technique of detecting a voice section including the user's voice from an input signal. Voice activity detection is mainly used for improving recognition accuracy of voice recognition, and/or used for supporting data compression in a non-voice section in the field of voice encoding.

Voice activity detection requires processing of detecting a voice section including predetermined voice from a time section of an input signal. For example, for determining whether the processing target frame is a voice (for example, speech) section or not, the voice section is detected from the input acoustic signal using a model trained in advance.

To further enhance processing accuracy of voice activation detection in an environment in which processing is difficult, such as a noise environment, a voice activity detection apparatus has been presented. The voice activity detection apparatus detects a voice section using both an acoustic signal and a non-acoustic signal, such as a lip image signal, as an input signal. For example, a technique disclosed in Non-patent Literature 1 (I. Ariav et al., "An End-to-End Multimodal Voice Activity Detection Using WaveNet Encoder and Residual Networks", IEEE Journal of Selected Topics in Signal Processing, Vol. 13, No. 2, pp 265-274, May 2019) is a technique of receiving an acoustic signal and a lip image signal as an input, calculating an utterance score on the basis of a deep neural network from an integrated feature, and detecting a voice section.

BRIEF DESCRIPTION OF THE DRAWINGS

FIG. 3 is a diagram schematically illustrating the voice activity detection processing.

FIG. 8 is a diagram illustrating verification results using a data set of CHiME4.

DETAILED DESCRIPTION

According to one embodiment, a voice activity detection apparatus includes a processing circuit. The processing circuit acquires an acoustic signal and a non-acoustic signal relating to a voice generation source. The processing circuit calculates an acoustic feature based on the acoustic signal. The processing circuit calculates a non-acoustic feature based on the non-acoustic signal. The processing circuit calculates a voice emphasized feature based on the acoustic signal and the non-acoustic signal. The processing circuit calculates a voice existence/non-existence feature on the basis of the acoustic feature and the non-acoustic feature. The processing circuit calculates a voice existence score based on the voice emphasized feature and the voice existence/non-existence feature. The processing circuit detects a voice section and/or a non-voice section based on comparison of the voice existence score with a threshold. The voice section being a time section in which voice is present. The non-voice section being a time section in which voice is absent.

Recently, with full-scale commercialization of voice recognition/voice interface and application thereof in various apparatuses, voice activity detection apparatuses have been exposed to much more various and complicated noise environments than before. For example, noise characteristics collected from the apparatuses are mutually different, and in use by the user with a mobile device during moving, the noise feature is changed to the real time. A limit still exists in maintaining the accuracy of voice activity detection under such various noise environments, and it is required to improve detection accuracy.

The problem to be solved by the present embodiment is to provide a voice activity detection apparatus, a learning apparatus, and a storage medium capable of improving detection accuracy under various noise environments.

The following is an explanation of a voice activity detection apparatus, a learning apparatus, and a storage medium according to the present embodiment with reference to drawings.

Voice Activity Detection Apparatus

Figure 1:
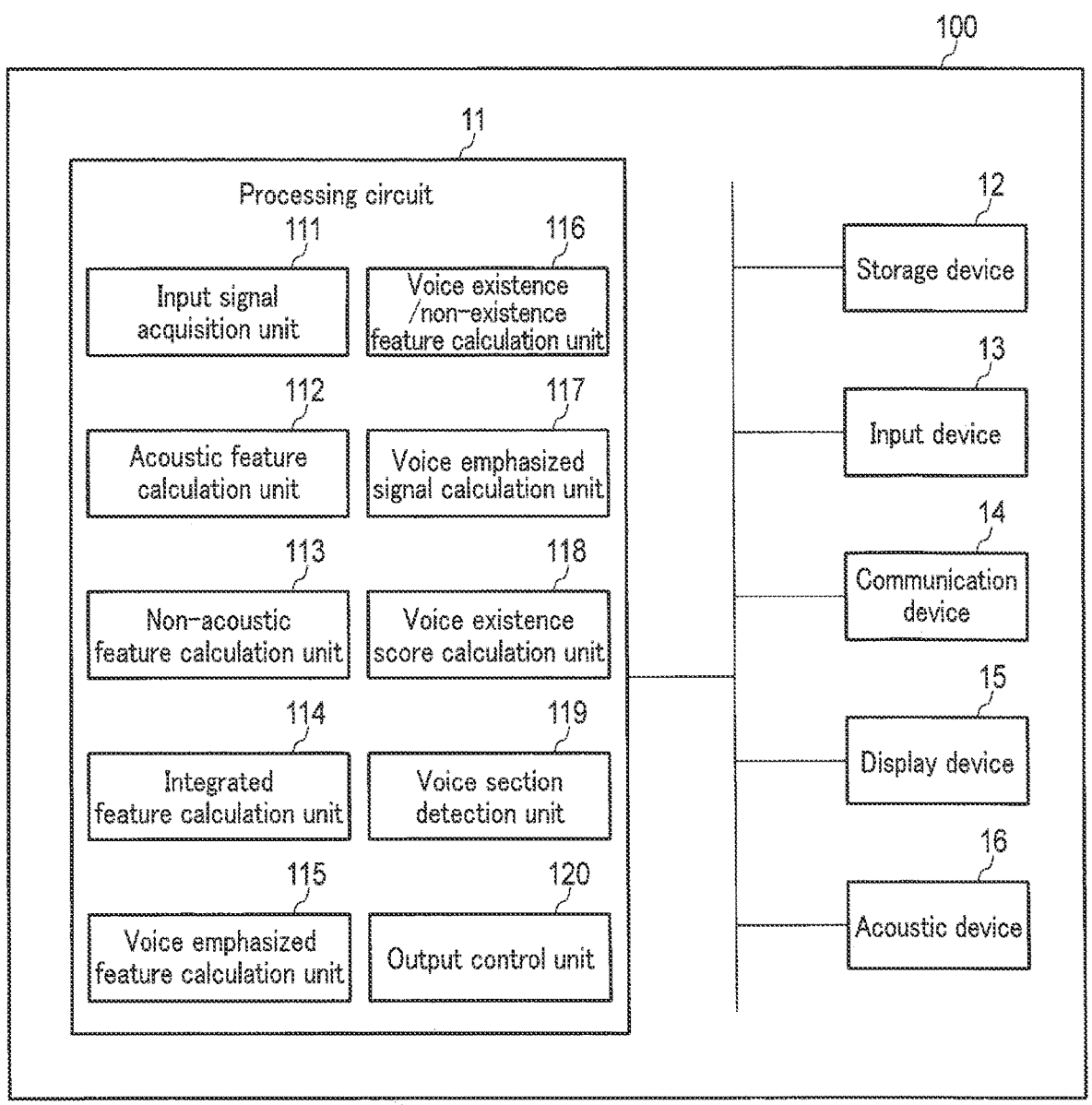
FIG. 1 is a diagram illustrating a configuration example of a voice activity detection apparatus.

FIG. 1 is a diagram illustrating a configuration example of a voice activity detection apparatus 100. The voice activity detection apparatus 100 is a computer detecting a voice section of an input signal. As illustrated in FIG. 1, the voice activity detection apparatus 100 includes a processing circuit 11, a storage device 12, an input device 13, a communication device 14, a display device 15, and an acoustic device 16.

The processing circuit 11 includes a processor, such as a CPU (Central Processing Unit), and a memory, such as a RAM (Random Access Memory). The processing circuit 11 executes voice activity detection processing of detecting a voice section of the input signal, by executing a voice activity detection program stored in the storage device 12. The voice activity detection program is recorded on a non-transitory computer-readable storage medium. The processing circuit 11 achieves an input signal acquisition unit 111, an acoustic feature calculation unit 112, a non-acoustic feature calculation unit 113, an integrated feature calculation unit 114, a voice emphasized feature calculation unit 115, a voice existence/non-existence feature calculation unit 116, a voice emphasized signal calculation unit 117, a voice existence score calculation unit 118, a voice section detection unit 119, and an output control unit 120, by reading and executing the voice activity detection program from the storage medium. The voice activity detection program may include a plurality of modules implemented with functions of the units 111 to 120 in a divided manner.

Hardware implementation of the processing circuit 11 is not limited to only the mode described above. For example, the processing circuit 11 may be formed of a circuit, such as an application specific integrated circuit (ASIC), achieving the input signal acquisition unit 111, the acoustic feature calculation unit 112, the non-acoustic feature calculation unit 113, the integrated feature calculation unit 114, the voice emphasized feature calculation unit 115, the voice existence/non-existence feature calculation unit 116, the voice emphasized signal calculation unit 117, the voice existence score calculation unit 118, the voice section detection unit 119, and/or the output control unit 120. The input signal acquisition unit 111, the acoustic feature calculation unit 112, the non-acoustic feature calculation unit 113, the integrated feature calculation unit 114, the voice emphasized feature calculation unit 115, the voice existence/non-existence feature calculation unit 116, the voice emphasized signal calculation unit 117, the voice existence score calculation unit 118, the voice section detection unit 119, and the output control unit 120 may be implemented in a single integrated circuit or individually implemented in a plurality of integrated circuits.

The input signal acquisition unit 111 acquires an acoustic signal and a non-acoustic signal relating to a voice generation source. The acoustic signal and the non-acoustic signal are time-series signals, and are temporally synchronized in units of frame. The acoustic signal is a signal relating to voice uttered by a speaker serving as the voice generation source. Specifically, the acoustic signal includes a voice signal derived from utterance of the speaker and a noise signal derived from noise. The non-acoustic signal is a signal other than the acoustic signal relating to the speaker and collected substantially simultaneously with the acoustic signal. For example, the non-acoustic signal is an image signal relating to the uttering speaker, and/or a sensor signal relating to physiological response of lips and/or a face muscle and brain waves of the speaker generated by utterance. The acoustic signal and the non-acoustic signal are supposed to be derived from the same voice generation source, but the voice generation source is not required to be strictly the same, as long as correlation exists between the acoustic signal and the non-acoustic signal.

The acoustic feature calculation unit 112 calculates a feature quantity (hereinafter referred to as "acoustic feature") of the acoustic signal. The acoustic feature has a value based on the acoustic signal and a value correlated with voice uttered by the speaker. The acoustic feature is calculated for each of frames. As an example, the acoustic feature is calculated using a first trained model. The first trained model is a neural network trained to receive an acoustic signal and output an acoustic feature. The first trained model is stored in the storage device 12 or the like.

The non-acoustic feature calculation unit 113 calculates a feature quantity (hereinafter referred to as "non-acoustic feature") of the non-acoustic signal. The non-acoustic feature has a value based on the non-acoustic signal and a feature value correlated with voice uttered by the speaker. The non-acoustic feature is calculated for each of frames. As an example, the non-acoustic feature is calculated using a second trained model. The second trained model is a neural network trained to receive a non-acoustic signal and output a non-acoustic feature. The second trained model is stored in the storage device 12 or the like.

Each of the first trained model and the second trained model is a neural network trained to reduce a first loss relating to a difference between the acoustic feature and the non-acoustic feature relating to the same voice generation source.

The integrated feature calculation unit 114 calculates an integrated feature on the basis of the acoustic feature and the non-acoustic feature. The integrated feature is calculated for each of frames. As an example, the integrated feature calculation unit 114 calculates an integrated feature calculated as a sum of the acoustic feature and the non-acoustic feature.

The voice emphasized feature calculation unit 115 calculates a feature quantity (hereinafter referred to as "voice emphasized feature") relating to an emphasized voice signal on the basis of the integrated feature. The voice signal means an acoustic signal derived from utterance by the speaker in the acoustic signal. The voice emphasized feature corresponds to a voice feature relating to a voice signal generated by separating and emphasizing only a voice signal by the speaker from the acoustic signal including noise. The voice emphasized feature is calculated for each of frames. As an example, the voice emphasized feature is calculated using a third trained model. The third trained model is a neural network trained to receive the integrated feature and output a voice emphasized feature. The third trained model is stored in the storage device 12 or the like.

The voice existence/non-existence feature calculation unit 116 calculates a feature quantity (hereinafter referred to as "voice existence/non-existence feature") relating to existence/non-existence of a voice signal on the basis of the integrated feature. The voice existence/non-existence feature has a value indicating existence/non-existence of the voice signal by the speaker from the acoustic signal including noise. The voice existence/non-existence feature is calculated for each of frames. As an example, the voice existence/non-existence feature is calculated using a fourth trained model. The fourth trained model is a neural network trained to receive the integrated feature and output a voice existence/non-existence feature. The fourth trained model is stored in the storage device 12 or the like.

Providing the integrated feature calculation unit 114 is not indispensable. Specifically, the voice emphasized feature calculation unit 115 does not necessarily calculate the voice emphasized feature from the integrated feature based on the acoustic feature and the non-acoustic feature, but may calculate the voice emphasized feature directly from the acoustic feature and the non-acoustic feature, or from another intermediate output based on the acoustic feature and the non-acoustic feature. As an example, the voice emphasized feature calculation unit 115 may calculate a voice emphasized feature from the acoustic feature and the non-acoustic feature serving as the processing target using a neural network trained to receive the acoustic feature and the non-acoustic feature and output a voice emphasized feature. In the same manner, the voice existence/non-existence feature calculation unit 116 does not necessarily calculate the voice existence/non-existence feature from the integrated feature based on the acoustic feature and the non-acoustic feature, but may calculate the voice existence/non-existence feature directly from the acoustic feature and the non-acoustic feature, or from another intermediate output based on the acoustic feature and the non-acoustic feature. As an example, the voice existence/non-existence feature calculation unit 116 may calculate a voice existence/non-existence feature from the acoustic feature and the non-acoustic feature serving as the processing target using a neural network trained to receive the acoustic feature and the non-acoustic feature and output a voice existence/non-existence feature. The following explanation is based on the supposition that the integrated feature calculation unit 114 is provided.

The voice emphasized signal calculation unit 117 calculates a voice emphasized signal on the basis of the voice emphasized feature and the voice existence/non-existence feature. The voice emphasized signal is a reconstructed voice signal acquired by separating and emphasizing only the voice signal by the speaker from the acoustic signal including noise. The voice emphasized signal is calculated for each of frames. As an example, the voice emphasized signal is calculated using a fifth trained model. The fifth trained model is a neural network trained to receive the voice emphasized feature and the voice existence/non-existence feature and output a voice emphasized signal. The fifth trained model is stored in the storage device 12 or the like.

Providing the voice emphasized signal calculation unit 117 is not indispensable. If no voice emphasized signal is used in the voice activity detection apparatus 100, no voice emphasized signal calculation unit 117 may be provided.

The voice existence score calculation unit 118 calculates a voice existence score on the basis of the voice emphasized feature and the voice existence/non-existence feature. The voice existence score is used as a scale to distinguish a voice section from a non-voice section. The voice section is a time section in which voice is uttered in the time sections of the input signal, and a non-voice section is a time section in which no voice is uttered in the time sections of the input signal. The voice existence score is calculated for each of frames. As an example, the voice existence score is calculated using a sixth trained model. The sixth trained model is a neural network trained to receive the voice emphasized feature and the voice existence/non-existence feature and output a voice existence score. The sixth trained model is stored in the storage device 12 or the like.

Each of the third trained model and the fifth trained model is a neural network trained to reduce a second loss relating to a difference between a correct voice signal relating to a voice signal by the speaker included in the acoustic signal and the voice emphasized signal.

Each of the fourth trained model and the sixth trained model is a neural network trained to reduce a third loss relating to a difference between a correct label relating to the voice section and the non-voice section and the voice existence score.

The voice section detection unit 119 detects a voice section and/or a non-voice section based on a comparison of the voice existence score with a threshold. The voice section is a time section in which voice is present. The non-voice section is a time section in which voice is absent.

The output control unit 120 displays various types of information via the display device 15 and/or the acoustic device 16. For example, the output control unit 120 displays an image signal on the display device 15 and/or outputs an acoustic signal via the acoustic device 16.

The storage device 12 is formed of, for example, a ROM (Read Only Memory), a HDD (Hard Disk Drive), a SSD (Solid State Drive), and/or an integrated circuit storage device. The storage device 12 stores therein various arithmetic calculation results acquired with the processing circuit 11 and/or the voice section detection program executed with the processing circuit 11 and the like. The storage device 12 is an example of a computer-readable storage medium.

The input device 13 inputs various commands from the user. Applicable examples of the input device 13 include a keyboard, a mouse, various types of switches, a touch pad, and a touch panel display. The output signal from the input device 13 is supplied to the processing circuit 11. The input device 13 may be a computer connected with the processing circuit 11 in a wired or wireless manner.

The communication device 14 is an interface to execute information communication with an external device connected with the voice activity detection apparatus 100 via a network. The communication device 14 receives an acoustic signal and a non-acoustic signal from, for example, a device collecting the acoustic signal and the non-acoustic signal, and/or receives the first trained model, the second trained model, the third trained model, the fourth trained model, the fifth trained model, and the sixth trained model from a learning apparatus described later.

The display device 15 displays various types of information. Applicable examples of the display device 15 include a CRT (Cathode-Ray Tube) display, a liquid crystal display, an organic EL (Electro Luminescence) display, a LED (Light-Emitting Diode) display, a plasma display, and any other displays known in the technical field. The display device 15 may be a projector.

The acoustic device 16 converts an electrical signal into voice and emits the voice. Applicable examples of the acoustic device 16 include a magnetic loudspeaker, a dynamic loudspeaker, a capacitor loudspeaker, and any other loudspeakers known in the technical field.

The following is an explanation of an example of voice activity detection processing executed with the processing circuit 11 of the voice activity detection apparatus 100. To specifically execute the following explanation, suppose that the non-acoustic signal is an image signal.

Figure 2:
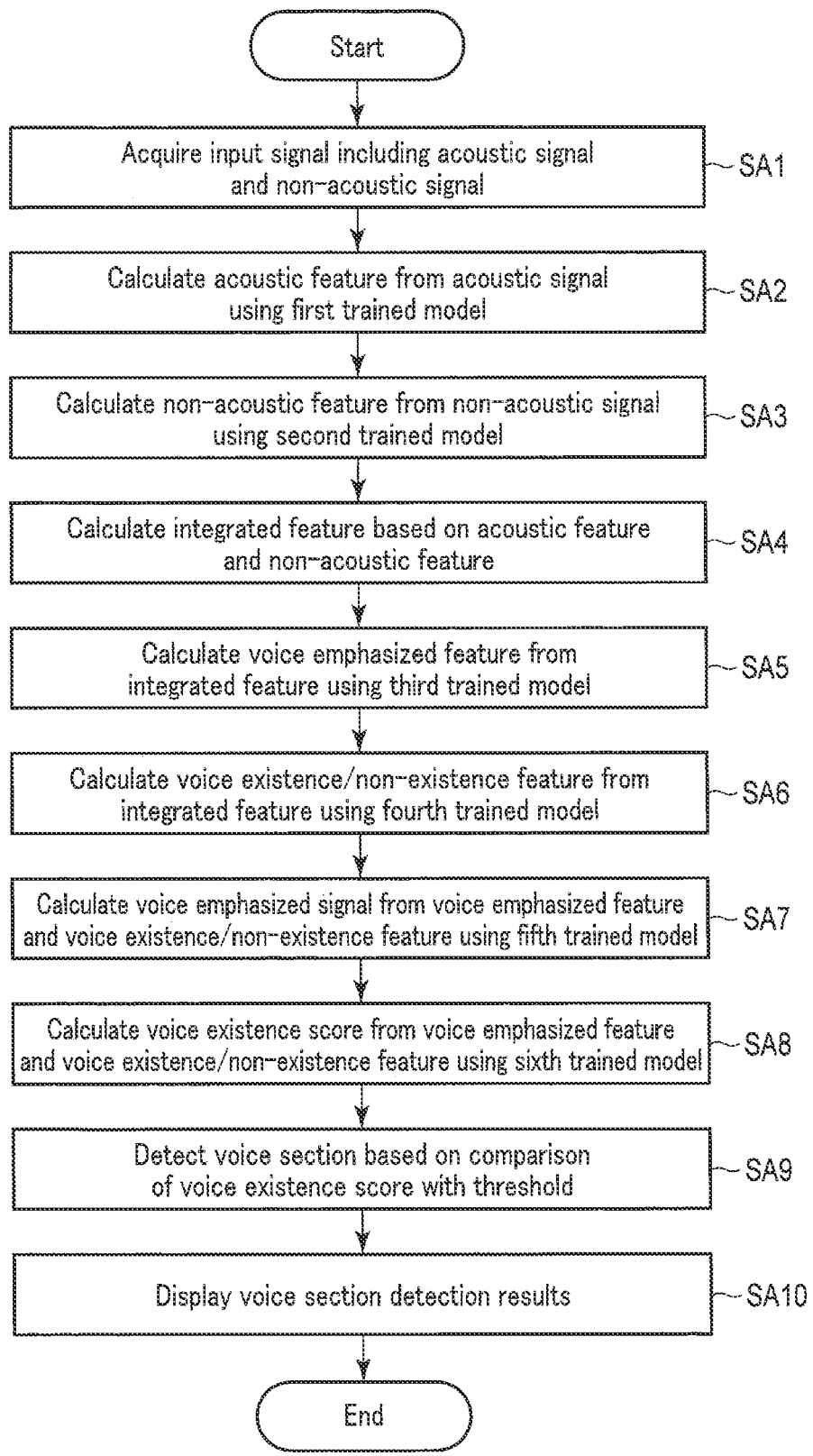
FIG. 2 is a diagram illustrating an example of flow of voice activity detection processing.

FIG. 2 is a diagram illustrating an example of flow of voice activity detection processing executed with the processing circuit 11. FIG. 3 is a diagram schematically illustrating the voice activity detection processing. The voice activity detection processing is executed with an operation of the processing circuit 11 in accordance with the voice activity detection program stored in the storage device 12 or the like.

As illustrated in FIG. 2 and FIG. 3, the input signal acquisition unit 111 acquires an input signal including an acoustic signal and an image signal (Step SA1). The input signal is a video signal including an acoustic signal and an image signal relating to the same voice generation source.

Figure 4:
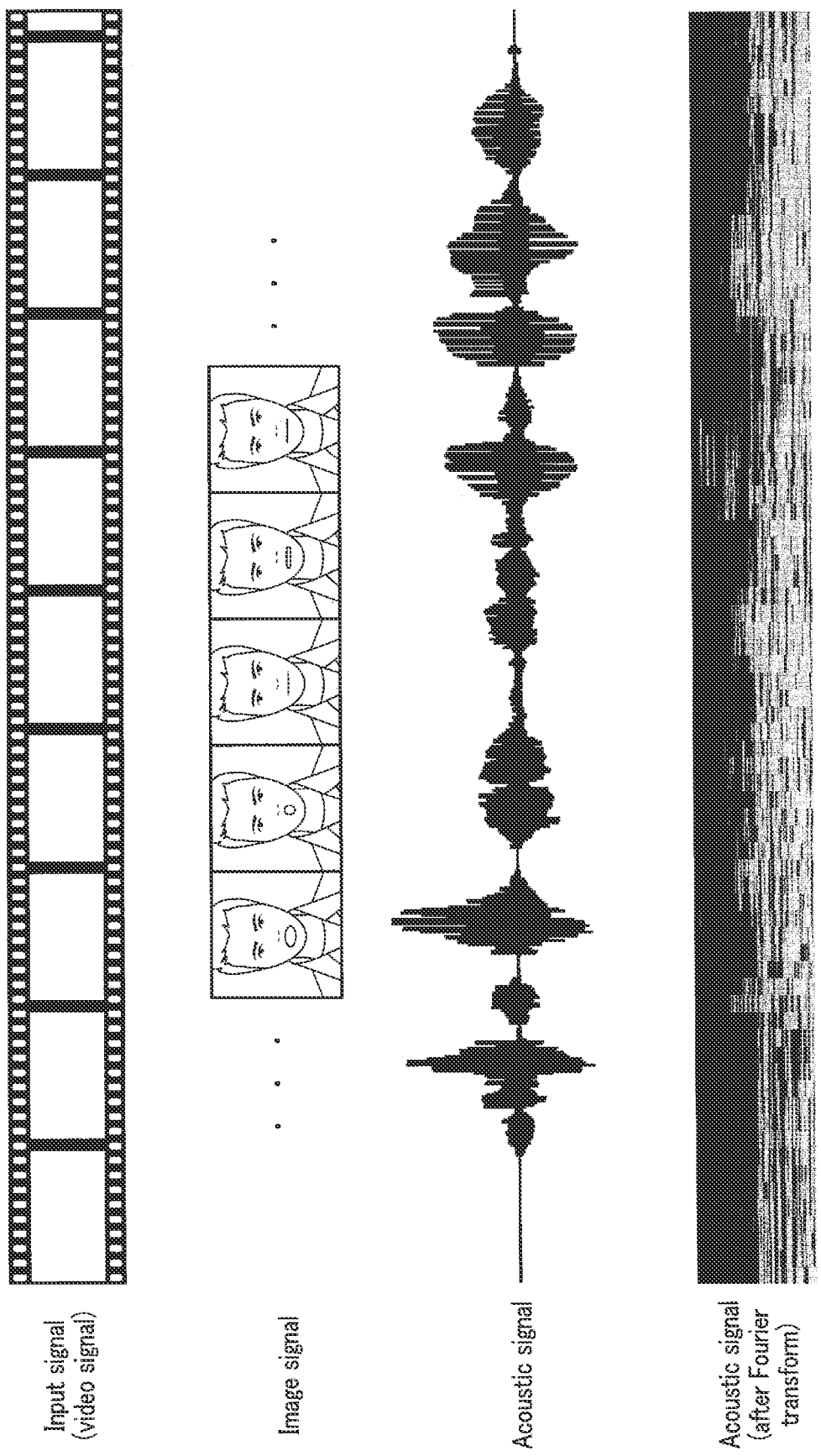
FIG. 4 is a diagram illustrating an example of an input signal (video signal), an acoustic signal, and an image signal.

FIG. 4 is a diagram illustrating an example of an input signal (video signal), an acoustic signal, and an image signal. As illustrated in FIG. 4, a video signal is a time-series signal including a time-series acoustic signal and a time-series image signal temporally synchronized with each other. The length of the time sections of the video signal is not particularly limited, but is supposed to be a frame length of 10 seconds or around.

The video signal is collected with a video camera device including a microphone and an imaging device. The acoustic signal is collected with the microphone. The microphone collects voice relating to utterance of the speaker, converts the sound pressure of the collected voice into an analog electrical signal (acoustic signal), and subjects the acoustic signal to A/D conversion to convert the acoustic signal into a digital time region electrical signal (acoustic signal). The time region acoustic signal is acquired with the input signal acquisition unit 111, and converted into a frequency region acoustic signal by short-time Fourier transform or the like. The image signal is collected almost simultaneously with the acoustic signal. The image signal is collected with the imaging device including a plurality of imaging elements, such as a CCD (Charge Coupled Device). The imaging device optically images the uttering speaker, and generates an image signal (image data) of a digital spatial region image signal (image data) relating to the speaker in units of frame. The image signal is required to be correlated with the speaker's utterance. As the imaging target, the image frame is required to include at least a lip area the form of which is changed in accordance with utterance. The image frame may include the whole face region of the speaker. The image signal is acquired in units of frame with the input signal acquisition unit 111.

In this example, suppose that the time-series acoustic signal A and the time-series image signal V are defined in accordance with the following expression (1). The time-series acoustic signal A is an acoustic signal including a T dimension of the time region and a F dimension of the frequency region of the frame serving as the processing target. The image signal V is an image signal including dimensions of the time T, the height H, the width W, and a color channel C.

$$A \in \mathbb{R}^{T \times F}$$

$$V \in \mathbb{R}^{T \times H \times W \times C} \quad (1)$$

When Step SA1 is executed, the acoustic feature calculation unit 112 calculates an acoustic feature $E_A$ from the acoustic signal A acquired at Step SA1 using the first trained model (Step SA2). The acoustic feature $E_A$ is calculated on the basis of the acoustic signal A for each of the frames. The acoustic feature $E_A$ is time-series data. The first trained model is a neural network trained to receive the acoustic signal A and output the acoustic feature $E_A$. For example, an encoder network trained to convert the acoustic signal A into the acoustic feature $E_A$ is used as the neural network. The first trained model is generated with a learning apparatus described later.

The relation between the acoustic signal and the acoustic feature herein is as follows. The acoustic signal is time-series waveform data of sound pressure values of the voice uttered by the speaker. The acoustic signal is correlated with the voice uttered by the speaker. For example, the peak value of the acoustic signal has a relatively high value when the speaker utters, and has a relatively low value when the speaker does not utter. The acoustic feature is designed such that the value has correlation with the peak value of the acoustic signal, in other words, to distinguish a voice component and a silent component included in the acoustic signal. For example, the value of the acoustic feature increases as the peak value of the acoustic signal increases, and the value of the acoustic feature decreases as the peak value of the acoustic signal decreases.

When Step SA2 is executed, the non-acoustic feature calculation unit 113 calculates an image feature $E_V$ from the image signal V acquired at Step SA1 using the second trained model (Step SA3). The image feature $E_V$ is calculated on the basis of the image signal V for each of frames. Specifically, the image feature $E_V$ is time-series data. The second trained model is a neural network trained to receive the image signal V and output the image feature $E_V$. For example, an encoder network trained to convert the image signal V into the image feature $E_V$ is used as the neural network. The second trained model is generated with a learning apparatus described later.

The relation between the image signal and the image feature is as follows. The image signal is correlated with the form of the face part region at the time when the speaker is uttering voice. The image feature is designed to distinguish an utterance component from a non-utterance component included in the image signal. Specifically, the lip area of the speaker indicated with the image signal has different forms between the time when the speaker utters voice and the time when the speaker does not utter voice. The image feature is designed such that the value thereof is correlated with the form of the face part region of the speaker. For example, the image feature has a higher value as the speaker opens one's mouth wider, and the image feature has a lower value as the speaker closes one's mouth.

Each of the first trained model and the second trained model is a neural network trained to reduce a difference between the acoustic feature $E_A$ and the image feature $E_V$ relating to normal input for the same voice generation source. The first trained model and the second trained model are generated with a learning apparatus described later.

The order of Step SA2 and Step SA3 is not particularly limited. Step SA2 may be executed after Step SA3, or Step SA2 and Step SA3 may be executed in parallel.

When Steps SA2 and SA3 are executed, the integrated feature calculation unit 114 calculates an integrated feature on the basis of the acoustic feature calculated at Step SA2 and the image feature calculated at Step SA3 (Step SA4). At Step SA4, the integrated feature calculation unit 114 calculates an integrated feature of the acoustic feature $E_A$ and the image feature $E_V$. The integrated feature $Z_{AV}$ is calculated for each frame time t. Specifically, the integrated feature $Z_{AV}$ is calculated as a sum of the acoustic feature $E_A$ and the image feature $E_V$, as expressed with the following expression (2).

$$Z_{AV}^{(t,d)} = E_A^{(t,d)} + E_V^{(t,d)} \quad (2)$$

In the expression, $E_A^{(t,d)}$ is an acoustic feature vector at the frame time $t \in \{1, 2, \ldots, T\}$ and the coordinates $d \in \{1, 2, \ldots, D\}$ compressed to D dimension, and serves as an example of the acoustic feature. $E_V^{(t,d)}$ is an image feature vector at the frame time $t \in \{1, 2, \ldots, T\}$ and coordinates $d \in \{1, 2, \ldots, D\}$ compressed to the D dimension, and an example of the image feature. $Z_{AV}^{(t,d)}$ is an integrated feature vector at the frame time $t \in \{1, 2, \ldots, T\}$ and the coordinates $d \in \{1, 2, \ldots, D\}$ compressed to D dimension, and serves as an example of the integrated feature.

When Step SA4 is executed, the voice emphasized feature calculation unit 115 calculates a voice emphasized feature $E_{SE}$ using the third trained model from the integrated feature $Z_{AV}$ acquired at Step SA4 (Step SA5). The voice emphasized feature $E_{SE}$ has a feature value acquired by separating and emphasizing only a voice signal derived from utterance of the speaker from the acoustic signal A. The voice emphasized feature $E_{SE}$ is calculated on the basis of the integrated feature $Z_{AV}$ of the frame.

When Step SA5 is executed, the voice existence/non-existence feature calculation unit 116 calculates a voice existence/non-existence feature $E_{VAD}$ using the fourth trained model from the integrated feature $Z_{AV}$ acquired at Step SA4 (Step SA6). The voice existence/non-existence feature $E_{VAD}$ has a feature value indicating existence/non-existence of a voice signal derived from utterance of the speaker in the acoustic signal A. The voice existence/non-existence feature $E_{VAD}$ is calculated on the basis of the integrated feature $Z_{AV}$ of the frame.

The order of Step SA5 and Step SA6 is not particularly limited. Step SA5 may be executed after Step SA6, or Step SA5 and Step SA6 may be executed in parallel.

When Step SA5 and Step SA6 are executed, the voice emphasized signal calculation unit 117 calculates a voice existence signal using a fifth trained model from the voice emphasized feature $E_{SE}$ acquired at Step SA5 and the voice existence/non-existence feature $E_{VAD}$ acquired at Step SA6 (Step SA7). The voice emphasized signal $Y_{SE}$ indicates a reconstructed voice signal acquired by separating and emphasizing only the voice signal derived from utterance of the speaker from the acoustic signal A including noise. The voice emphasized signal $Y_{SE}$ is calculated on the basis of the voice emphasized feature $E_{SE}$ and the voice existence/non-existence feature $E_{VAD}$ for each of the frames.

When Step SA5 and Step SA6 are executed, the voice existence score calculation unit 118 calculates a voice existence score $Y_{VAD}$ using a sixth trained model from the voice emphasized feature $E_{SE}$ acquired at Step SA5 and the voice existence/non-existence feature $E_{VAD}$ acquired at Step SA6 (Step SA8). The voice emphasized score $Y_{VAD}$ indicates score of existence of voice in the frame. The voice emphasized score $Y_{VAD}$ is calculated on the basis of the voice emphasized feature $E_{SE}$ and the voice existence/non-existence feature $E_{VAD}$ for each of the frames.

Each of the third trained model and the fifth trained model is a neural network trained to reduce a second loss function relating to a difference between a correct voice signal relating to the voice signal and the voice emphasized signal $Y_{SE}$. Examples of the neural network is an estimation network trained to estimate a voice emphasized feature $E_{SE}$ from the integrated feature $Z_{AV}$, and an estimation network trained to estimate a voice emphasized signal $Y_{SE}$ from the voice emphasized feature $E_{SE}$ and the voice existence/non-existence feature $E_{VAD}$. The third trained model and the fifth trained model are generated with a learning apparatus described later.

Each of the fourth trained model and the sixth trained model is a neural network trained to reduce a third loss function relating to a difference between a correct label relating to the voice section and the voice existence score $Y_{VAD}$. Examples of the neural network is an estimation network trained to estimate a voice existence/non-existence feature $E_{VAD}$ from the integrated feature $Z_{AV}$, and an estimation network trained to estimate a voice existence score $Y_{VAD}$ from the voice emphasized feature $E_{SE}$ and the voice existence/non-existence feature $E_{VAD}$. The fourth trained model and the sixth trained model are generated with a learning apparatus described later.

When Step SA8 is executed, the voice section detection unit 119 detects a voice section on the basis of comparison of the voice existence score $Y_{VAD}$ calculated at Step SA8 with a threshold η (Step SA9).

The value of the voice existence score $Y_{VAD}$ is compared with a threshold η for each frame time. The threshold η is set to a boundary between the value corresponding to utterance and the value not corresponding to utterance. For example, when the voice existence score Y has the value ranging from "0" to "1", the threshold η is set to the value "0.5". In the case where the value of the voice existence score $Y_{VAD}$ is larger than the threshold η, the frame time is determined as a voice section. In the case where the value of the voice existence score $Y_{VAD}$ is smaller than the threshold η, the frame time is determined as a non-voice section. By executing the determination processing for each frame time, the voice sections and the non-voice sections are detected in the time sections corresponding to the input signal. A label of a voice section or a non-voice section is assigned to each frame time of the input signal.

When Step SA9 is executed, the output control unit 120 outputs the voice sections and/or the non-voice sections detected at Step SA9 (Step SA10). Various forms are possible as the output form. As an example, at Step SA10, the output control unit 120 displays the voice sections and/or the non-voice sections on the display device 15. In this operation, the output control unit 120 preferably displays the voice sections and/or the non-voice sections in visually association with the acoustic signal and/or the image signal. The output control unit 120 may output the acoustic emphasized signal calculated at Step SA7 via the acoustic device 16.

The voice activity detection processing with the processing circuit 11 is finished with the operation described above. The input signal after voice activity detection is subjected to processing, such as voice recognition and data compression.

The voice activity detection processing illustrated in FIG. 2 and FIG. 3 is an example, and the voice activity detection processing according to the present embodiment is not limited to the process illustrated in FIG. 2 and FIG. 3. As described above, no voice emphasized signal calculation unit 117 may be provided. In this case, no Step SA7 may be executed. In addition, no integrated feature calculation unit 114 may be provided. In this case, no Step SA4 may be executed.

As described above, the voice activity detection apparatus 100 according to the present embodiment includes the acoustic feature calculation unit 112, the non-acoustic feature calculation unit 113, the voice emphasized feature calculation unit 115, the voice existence/non-existence feature calculation unit 116, the voice existence score calculation unit 118, and the voice section detection unit 119. The acoustic feature calculation unit 112 calculates an acoustic feature on the basis of the acoustic signal. The acoustic feature has a value correlated with pronunciation. The non-acoustic feature calculation unit 113 calculates an acoustic feature on the basis of the non-acoustic signal. The non-acoustic feature has a value correlated with pronunciation. The voice emphasized feature calculation unit 115 calculates a voice emphasized feature from the acoustic feature and the non-acoustic feature. The voice existence/non-existence feature calculation unit 116 calculates a voice existence/non-existence feature from the acoustic feature and the non-acoustic feature. The voice existence score calculation unit 118 calculates a voice existence score from the voice emphasized feature and the voice existence/non-existence feature. The voice section detection unit 119 detects a voice section serving as a time section in which voice is uttered and/or a non-voice section serving as a time section in which no voice is uttered on the basis of comparison of the voice existence score with a threshold.

According to the present embodiment, the voice emphasized feature and the voice existence/non-existence feature are calculated from the acoustic feature based on the acoustic signal and the non-acoustic feature based on the non-acoustic feature, and a voice existence score is calculated from the voice existence/non-existence feature in consideration of the voice emphasized feature. This structure enables detection of a voice section with high accuracy even in various noise environments. In addition, preferably the voice emphasized feature is calculated from the integrated feature using the third trained model, and the third trained model is generated by learning using a loss function defined to reduce the second loss relating to a difference between a correct voice signal and the voice emphasized signal. By acquiring the voice emphasized feature using the third trained model acquired by such learning, the voice existence score is calculated from the voice existence/non-existence feature in consideration of the voice emphasized feature. This structure enables further improvement in detection accuracy for the voice section and/or the non-voice section even in the case where various types of noise exist.

Learning Apparatus

Figure 5:
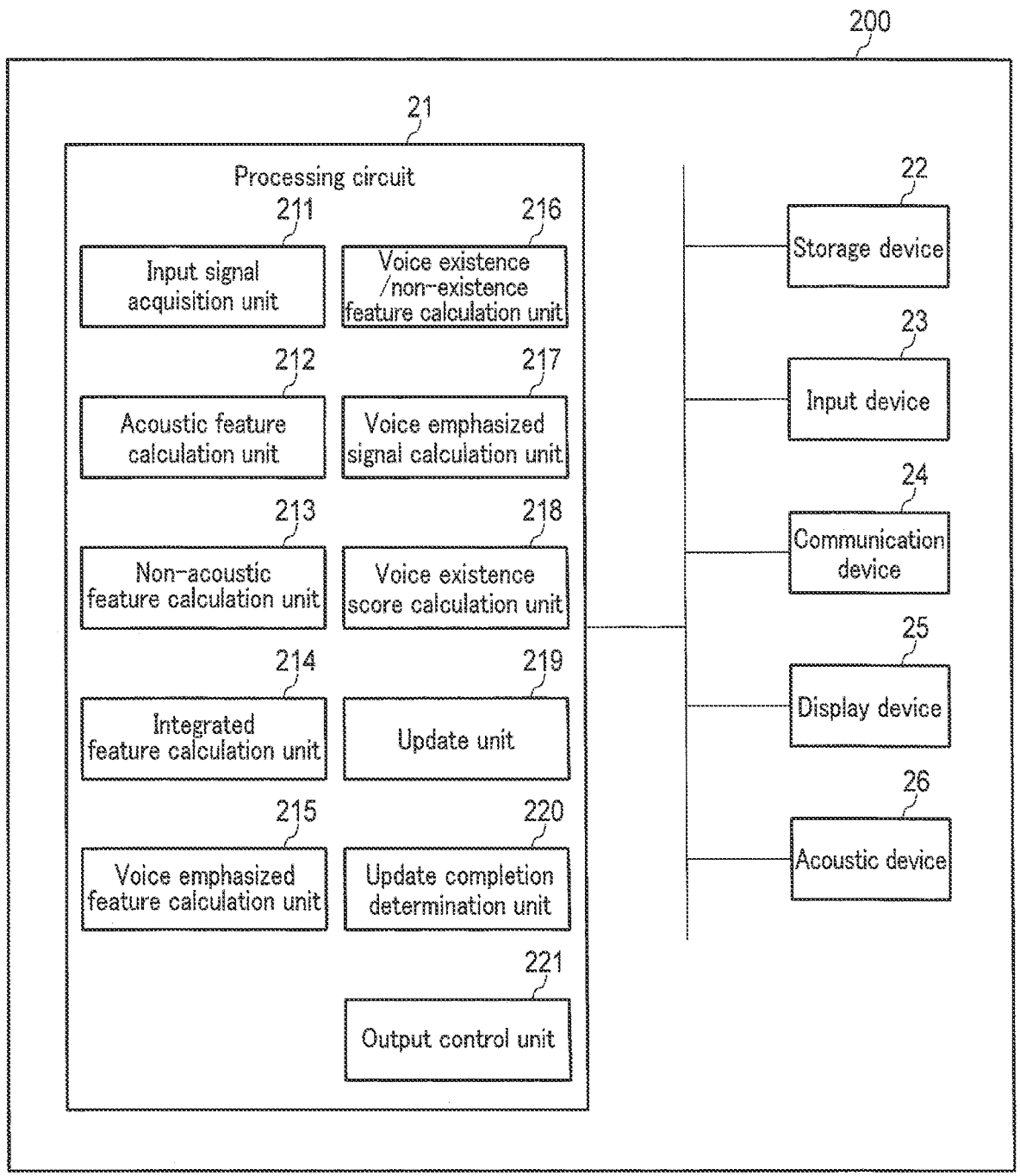
FIG. 5 is a diagram illustrating a configuration example of a learning apparatus.

FIG. 5 is a diagram illustrating a configuration example of a learning apparatus 200. The learning apparatus 200 is a computer generating a first trained model used for calculation of the acoustic feature, a second trained model used for calculation of the image feature, a third trained model used for calculation of a voice emphasized feature, a fourth trained model used for calculation of a voice existence/non-existence feature, a fifth trained model used for calculation of a voice emphasized signal, and a sixth trained model used for detection of a voice section and/or a non-voice section. As illustrated in FIG. 5, the learning apparatus 200 includes a processing circuit 21, a storage device 22, an input device 23, a communication device 24, a display device 25, and an acoustic device 26.

The processing circuit 21 includes a processor, such as a CPU, and a memory, such as a RAM. The processing circuit 21 executes learning processing to generate the first trained model, the second trained model, the third trained model, the fourth trained model, the fifth trained model, and the sixth trained model by executing a learning program stored in the storage device 22. The learning program is recorded on a non-transitory computer-readable storage medium. The processing circuit 21 achieves an input signal acquisition unit 211, an acoustic feature calculation unit 212, a non-acoustic feature calculation unit 213, an integrated feature calculation unit 214, a voice emphasized feature calculation unit 215, a voice existence/non-existence calculation unit 216, a voice emphasized signal calculation unit 217, a voice existence score calculation unit 218, an update unit 219, an update completion determination unit 220, and an output control unit 221, by reading and executing the learning program from the storage medium. The learning program may include a plurality of modules implemented with functions of the units 211 to 221 in a divided manner.

Hardware implementation of the processing circuit 21 is not limited to only the mode described above. For example, the processing circuit 21 may be formed of a circuit, such as an application specific integrated circuit (ASIC), achieving the input signal acquisition unit 211, the acoustic feature calculation unit 212, the non-acoustic feature calculation unit 213, the integrated feature calculation unit 214, the voice emphasized feature calculation unit 215, the voice existence/non-existence calculation unit 216, the voice emphasized signal calculation unit 217, the voice existence score calculation unit 218, the update unit 219, the update completion determination unit 220, and the output control unit 221. The input signal acquisition unit 211, the acoustic feature calculation unit 212, the non-acoustic feature calculation unit 213, the integrated feature calculation unit 214, the voice emphasized feature calculation unit 215, the voice existence/non-existence calculation unit 216, the voice emphasized signal calculation unit 217, the voice existence score calculation unit 218, the update unit 219, the update completion determination unit 220, and/or the output control unit 221 may be implemented in a single integrated circuit or individually implemented in a plurality of integrated circuits.

The input signal acquisition unit 211 acquires training data including a plurality of training samples. Each of the training samples is an input signal including a pair of an acoustic signal and a non-acoustic signal. The input signal is a time-series signal, and includes a time-series acoustic signal and a time-series non-acoustic signal. As described above, the non-acoustic signal is an image signal relating to the uttering speaker, and/or a sensor signal relating to physiological response of lips and/or a face muscle of the speaker generated by utterance.

The acoustic feature calculation unit 212 calculates an acoustic feature from the acoustic signal using a first neural network. The acoustic feature calculated with the acoustic feature calculation unit 212 is similar to the acoustic feature calculated with the acoustic feature calculation unit 112. The first trained model is generated by training the first neural network.

The non-acoustic feature calculation unit 213 calculates a non-acoustic feature from the non-acoustic signal using a second neural network. The non-acoustic feature calculated with the non-acoustic feature calculation unit 213 is similar to the non-acoustic feature calculated with the non-acoustic feature calculation unit 113. The second trained model is generated by training the second neural network.

The first neural network and the second neural network are trained to reduce a first loss relating to a difference between the acoustic feature and the non-acoustic feature relating to the same voice generation source.

The integrated feature calculation unit 214 calculates an integrated feature on the basis of the acoustic feature calculated with the acoustic feature calculation unit 212 and the non-acoustic feature calculated with the non-acoustic feature calculation unit 213. The integrated feature calculated with the integrated feature calculation unit 214 is similar to the integrated feature calculated with the integrated feature calculation unit 114.

The voice emphasized feature calculation unit 215 calculates a voice emphasized feature from the integrated feature using the third neural network. The voice emphasized feature calculated with the voice emphasized feature calculation unit 215 is similar to the voice emphasized feature calculated with the voice emphasized feature calculation unit 115. The third trained model is generated by training the third neural network.

The voice existence/non-existence calculation unit 216 calculates a voice existence/non-existence feature from the integrated feature using the fourth neural network. The voice existence/non-existence feature calculated with the voice existence/non-existence feature calculation unit 216 is similar to the voice existence/non-existence feature calculated with the voice existence/non-existence feature calculation unit 116. The fourth trained model is generated by training the fourth neural network.

The voice emphasized signal calculation unit 217 calculates a voice emphasized signal from the voice emphasized feature and the voice existence/non-existence feature using the fifth neural network. The voice emphasized signal calculated with the voice emphasized signal calculation unit 217 is similar to the voice emphasized signal calculated with the voice emphasized signal calculation unit 117. The fifth trained model is generated by training the fifth neural network.

The voice existence score calculation unit 218 calculates a voice existence score from the voice emphasized feature and the voice existence/non-existence feature using the sixth neural network. The voice existence score calculated with the voice existence score calculation unit 218 is similar to the voice existence score calculated with the voice existence score calculation unit 118. The sixth trained model is generated by training the sixth neural network.

Each of the third neural network and the fifth neural network is trained to reduce a second loss relating to a difference between a correct voice signal relating to a voice signal by the speaker included in the acoustic signal and the voice emphasized signal. The correct voice signal is an acoustic signal acquired by emphasizing a voice signal derived from utterance of the same voice generation source (speaker) as that of the acoustic signal acquired with the input signal acquisition unit 211. As an example, the correct voice signal is an acoustic signal acquired by collecting utterance of the voice generation source in an environment without noise. In this case, the acoustic signal acquired with the input signal acquisition unit 211 is generated by adding a noise signal to the correct voice signal. As a matter of course, the acoustic signal may be acquired by collecting utterance of the voice generation source in an environment with noise, separately from the correct voice signal. As another example, the correct voice signal may be an acoustic signal acquired by removing a noise signal from an acoustic signal acquired by collecting utterance of the voice generation source in an environment with noise. In this case, an acoustic signal before noise removal is preferably used as the acoustic signal acquired with the input signal acquisition unit 211. As a matter of course, the acoustic signal may be acquired by collecting utterance of the voice generation source in an environment with noise, separately from the correct voice signal.

Each of the fourth neural network and the sixth neural network is trained to reduce a third loss relating to a difference between the correct label relating to the voice section and the non-voice section and the voice existence score. The correct label is acquired by providing a label indicating that the frame is a voice section or a label indicating that the frame is a non-voice section to each frame of the acoustic signal. The correct label may be manually prepared on the basis of an acoustic signal, automatically prepared using a voice recognition technique or the like, or prepared by a combination of the manual method and the automatic method.

The update unit 219 updates the first neural network, the second neural network, the third neural network, the fourth neural network, the fifth neural network, and the sixth neural network using a total loss function including a first loss function relating to a difference between the acoustic feature and the non-acoustic feature relating to the voice generation source, a second loss function relating to a difference between a correct voice signal and the voice emphasized signal, and a third loss function relating to a difference between a correct label relating to the voice section and the non-voice section and the voice existence score.

The update completion determination unit 220 determines whether the condition for stopping the learning processing is satisfied. In the case where it is determined that the stop condition is not satisfied, the processing circuit 21 repeats calculation of the acoustic feature with the acoustic feature calculation unit 212, calculation of the non-acoustic feature with the non-acoustic feature calculation unit 213, calculation of the integrated feature with the integrated feature calculation unit 214, calculation of the voice emphasized feature with the voice emphasized feature calculation unit 215, calculation of the voice existence/non-existence feature with the voice existence/non-existence feature calculation unit 216, calculation of the voice emphasized signal with the voice emphasized signal calculation unit 217, calculation of the voice existence score with the voice existence score calculation unit 218, and update of the first neural network, the second neural network, the third neural network, the fourth neural network, the fifth neural network, and the sixth neural network with the update unit 219. In the case where it is determined that the stop condition is satisfied, the first neural network at this point in time is output as the first trained model, the second neural network at this point in time is output as the second trained model, the third neural network at this point in time is output as the third trained model, the fourth neural network at this point in time is output as the fourth trained model, the fifth neural network at this point in time is output as the fifth trained model, and the sixth neural network at this point in time is output as the sixth trained model.

The output control unit 221 displays various types of information via the display device 25 and/or the acoustic device 26. For example, the output control unit 221 displays an image signal on the display device 25 and/or outputs an acoustic signal via the acoustic device 26.

The storage device 22 is formed of, for example, a ROM, a HDD, a SSD, and/or an integrated circuit storage device. The storage device 22 stores therein various arithmetic calculation results acquired with the processing circuit 21 and/or the learning program executed with the processing circuit 21 and the like. The storage device 22 is an example of a computer-readable storage medium.

The input device 23 inputs various commands from the user. Applicable examples of the input device 23 include a keyboard, a mouse, various types of switches, a touch pad, and a touch panel display. The output signal from the input device 23 is supplied to the processing circuit 21. The input device 23 may be a computer connected with the processing circuit 21 in a wired or wireless manner.

The communication device 24 is an interface to execute information communication with an external device connected with the learning apparatus 200 via a network.

The display device 25 displays various types of information. Applicable examples of the display device 25 include a CRT display, a liquid crystal display, an organic EL display, a LED display, a plasma display, and any other displays known in the technical field. The display device 25 may be a projector.

The acoustic device 26 converts an electrical signal into voice and emits the voice. Applicable examples of the acoustic device 26 include a magnetic loudspeaker, a dynamic loudspeaker, a capacitor loudspeaker, and any other loudspeakers known in the technical field.

The following is an explanation of an example of learning processing executed with the processing circuit 21 of the learning apparatus 200. To specifically execute the following explanation, suppose that the non-acoustic signal is an image signal.

Figure 6:
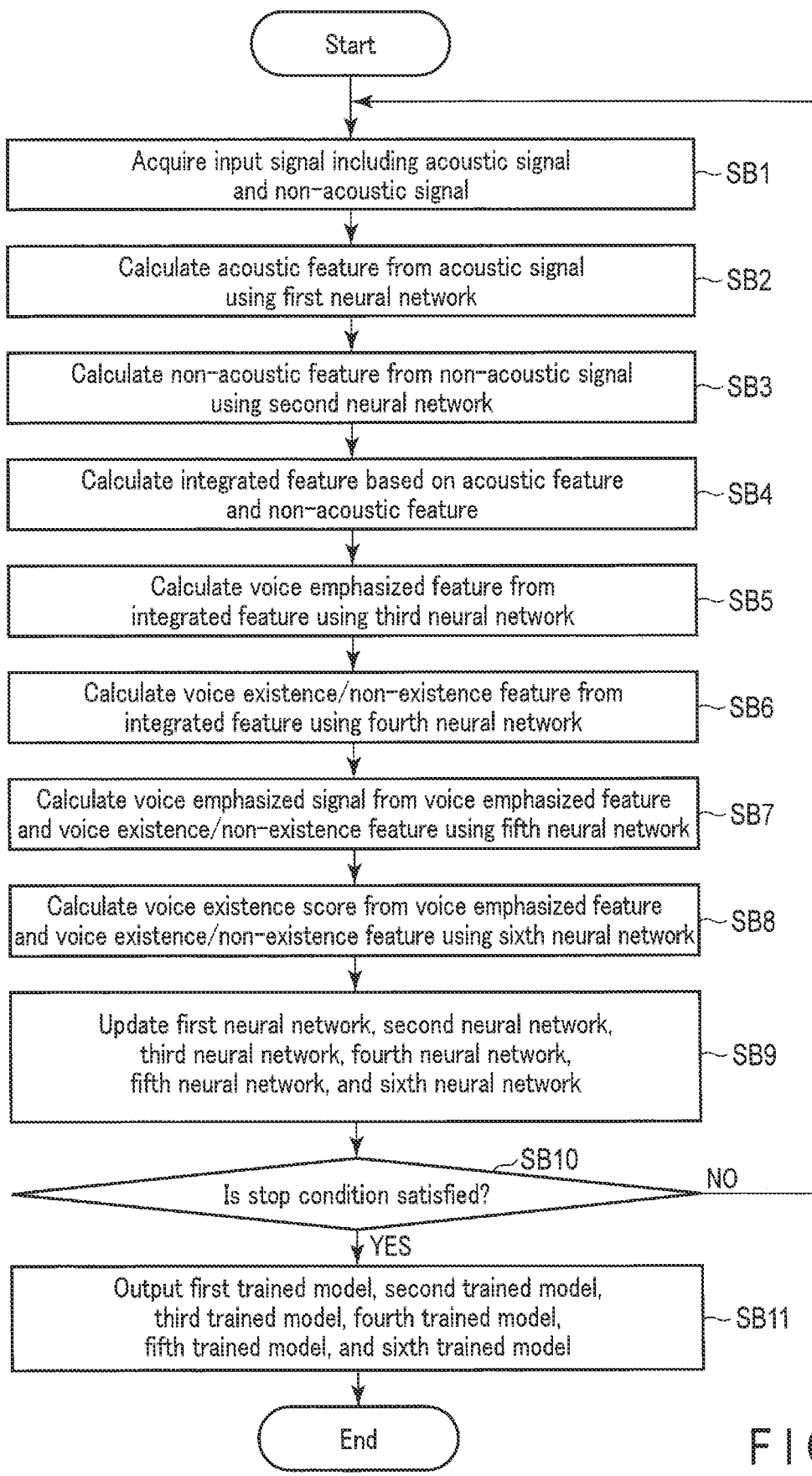
FIG. 6 is a diagram illustrating an example of flow of learning processing.

FIG. 6 is a diagram illustrating an example of flow of learning processing executed with the processing circuit 21. The learning processing is executed by operation of the processing circuit 21 in accordance with the learning program stored in the storage device 22 or the like. In the learning processing, the processing circuit 21 trains a first neural network NN1, a second neural network NN2, a third neural network NN3, a fourth neural network NN4, a fifth neural network NN5, and a sixth neural network NN6 in parallel. More specifically, the processing circuit 21 subjects an integrated neural network including the first neural network NN1, the second neural network NN2, the third neural network NN3, the fourth neural network NN4, the fifth neural network NN5, and the sixth neural network NN6 to supervised learning using training data.

Figure 7:
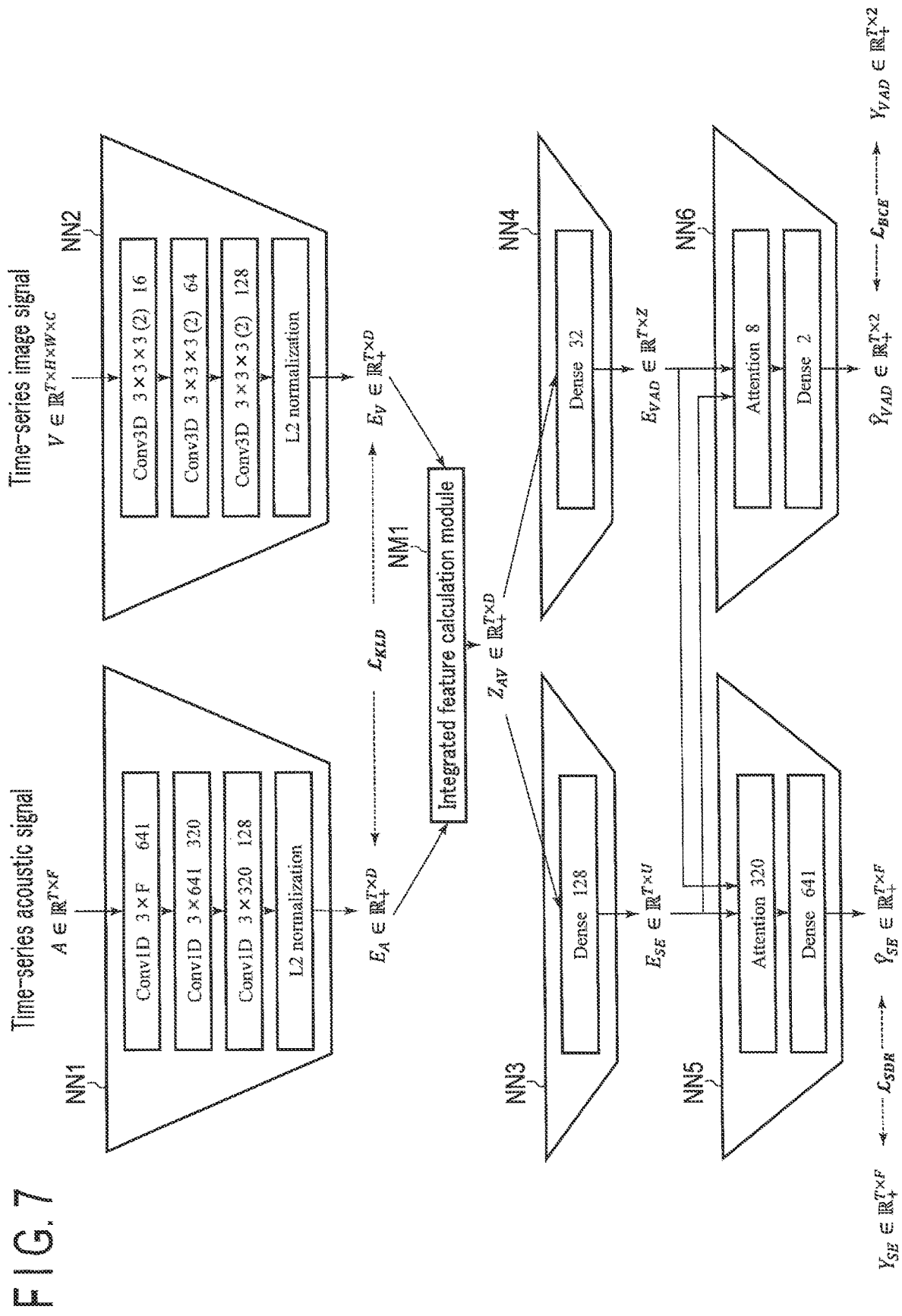
FIG. 7 is a configuration example of an integrated neural network.

FIG. 7 is a diagram illustrating a configuration example of an integrated neural network. As illustrated in FIG. 7, the integrated neural network includes the first neural network NN1, the second neural network NN2, an integrated feature calculation module NM1, the third neural network NN3, the fourth neural network NN4, the fifth neural network NN5, and the sixth neural network NN6.

The first neural network NN1 receives an acoustic signal A and outputs an acoustic feature $E_A$. The second neural network NN2 receives an image signal V and outputs an image feature $E_V$. The integrated feature calculation module NM1 receives the acoustic feature $E_A$ output from the first neural network NN1 and the image feature $E_V$ output from the second neural network NN2, and outputs an integrated feature $Z_{AV}$. The integrated feature calculation module NM1 is a module corresponding to the function of the integrated feature calculation unit 214. The third neural network NN3 receives the integrated feature $Z_{AV}$ output from the integrated feature calculation module NM1, and outputs a voice emphasized feature $E_{SE}$. The fourth neural network NN4 receives the integrated feature $Z_{AV}$ output from the integrated feature calculation module NM1, and outputs a voice existence/non-existence feature $E_{VAD}$. The fifth neural network NN5 receives the voice emphasized feature $E_{SE}$ output from the third neural network NN3 and the voice existence/non-existence feature $E_{VAD}$ output from the fourth neural network NN4, and outputs a voice emphasized signal $\hat{Y}_{SE}$. The sixth neural network receives the voice emphasized feature $E_{SE}$ output from the third neural network NN3 and the voice existence/non-existence feature $E_{VAD}$ output from the fourth neural network NN4, and outputs a voice existence score $\hat{Y}_{VAD}$.

Suppose that initial values of learning parameters or the like are assigned to the first neural network NN1, the second neural network NN2, the third neural network NN3, the fourth neural network NN4, the fifth neural network NN5, and the sixth neural network NN6. The learning parameters are weights and/or biases and the like. Desired hyperparameters may be included as the learning parameters.

The first neural network NN1 has architecture of an encoder network capable of calculating the acoustic feature $E_A$ from the acoustic signal A. As an example, the first neural network NN1 includes three one-dimensional convolutional layers and a L2 normalization layer. The second neural network NN2 has architecture of an encoder network capable of calculating the image feature $E_V$ from the image signal V. As an example, the second neural network NN2 includes three three-dimensional convolutional layers and a L2 normalization layer. At least one of the three three-dimensional convolutional layers is preferably connected to a maximum value pooling layer and/or a global mean value pooling layer.

The third neural network NN3 has architecture of a detection network capable of calculating a voice emphasized feature $E_{SE}$ from the integrated feature $Z_{AV}$. As an example, the third neural network NN3 includes a dense (Dense) layer. The fourth neural network NN4 has architecture of a detection network capable of calculating a voice existence/non-existence feature $E_{VAD}$ from the integrated feature $Z_{AV}$. As an example, the fourth neural network NN4 includes a dense (Dense) layer.

The fifth neural network NN5 has architecture of a detection network capable of calculating a voice emphasized signal $\hat{Y}_{SE}$ from the voice emphasized feature $E_{SE}$ and the voice existence/non-existence feature $E_{VAD}$. As an example, the fifth neural network NN5 includes an attention (Attention) layer and a dense (Dense) layer. The numerical expression of the attention layer is expressed with the following expression (3). As expressed with the expression (3), the attention layer is a neural network layer mainly receiving the voice emphasized feature $E_{SE}$ and defined by the inner product thereof with the voice existence/non-existence feature $E_{VAD}$, $d_{key}$ serving as a scale factor, and a Softmax function using $W_{key}$, $W_{qry}$ and $W_{val}$ serving as three elements of memory. More specifically, the output value $CTA_{SE}$ of the attention layer is acquired by the inner product of a Softmax arithmetic value, $E_{SE}$, and $W_{val}$. The Softmax arithmetic value is output by subjecting the inner product of the transposition of the inner product of $E_{SE}$ and $W_{key}$, the reciprocal of the square root of $d_{key}$, $E_{VAD}$ and $W_{qry}$ to Softmax arithmetic operation. The dense layer is a network layer calculating a voice emphasized signal $\hat{Y}_{SE}$ from the output value $CTA_{SE}$.

$$CTA_{SE}^{(t,:)} = \mathrm{softmax}\left(\frac{1}{\sqrt{d_{key}}} \cdot E_{VAD}^{(t,:)} \cdot W_{qry} \cdot \left(E_{SE}^{(t,:)} \cdot W_{key}\right)^\top\right) \cdot E_{SE}^{(t,:)} \cdot W_{val} \quad (3)$$

The sixth neural network NN6 has architecture of a detection network capable of calculating a voice existence score $\hat{Y}_{VAD}$ from the voice emphasized feature $E_{SE}$ and the voice existence/non-existence feature $E_{VAD}$. As an example, the sixth neural network NN6 includes an attention layer and a dense layer. The numerical expression of the attention layer is expressed with the following expression (4). As expressed with the expression (4), the attention layer is a neural network layer mainly receiving the voice existence/non-existence feature $E_{VAD}$ and defined by the inner product thereof with the voice emphasized feature $E_{SE}$, $d_{key}$ serving as a scale factor, and a Softmax function using $W_{key}$, $W_{qry}$, and $W_{val}$ serving as three elements of memory. More specifically, the output value $CTA_{VAD}$ of the attention layer is acquired by the inner product of a Softmax arithmetic value, $E_{VAD}$, and $W_{val}$. The Softmax arithmetic value is output by subjecting the inner product of the transposition of the inner product of $E_{VAD}$ and $W_{key}$, the reciprocal of the square root of $d_{key}$, $E_{SE}$, and $W_{qry}$ to SoftMax arithmetic operation. The dense layer is a network layer calculating a voice existence score $\hat{Y}_{VAD}$ from the output value $CTA_{VAD}$.

$$CTA_{VAD}^{(t,:)} = \mathrm{softmax}\left(\frac{1}{\sqrt{d_{key}}} \cdot E_{SE}^{(t,:)} \cdot W_{qry} \cdot \left(E_{VAD}^{(t,:)} \cdot W_{key}\right)^\top\right) \cdot E_{VAD}^{(t,:)} \cdot W_{val} \quad (4)$$

Each of all the convolutional layers and the Dense layers of the first neural network NN1, the second neural network NN2, the third neural network NN3, the fourth neural network NN4, the fifth neural network NN5, and the sixth neural network NN6 are followed by a normalization linear function unit, and a normalization linear function is applied to the output of the layer. The final layer of each of the fifth neural network NN5 and the sixth neural network NN6 is followed by a sigmoid activation function unit, not a normalization linear function unit, and a sigmoid function is applied to the output of the final layer.

The integrated neural network receives the acoustic signal A and the image signal V, and outputs a voice emphasized signal $\hat{Y}_{SE}$ and a voice existence score $\hat{Y}_{VAD}$. THE LEARNING PARAMETERS OF THE FIRST NEURAL NETWORK NN1, the second neural network NN2, the third neural network NN3, the fourth neural network NN4, the fifth neural network NN5, and the sixth neural network NN6 are trained to minimize a total loss function including a first loss function relating to a difference between the acoustic feature $E_A$ and the non-acoustic feature $E_V$, a second loss function relating to a difference between the voice emphasized signal $\hat{Y}_{SE}$ and the correct voice signal (ground truth) $Y_{SE}$, and a third loss function relating to a difference between the voice existence score $\hat{Y}_{VAD}$ and the correct label (ground truth) $Y_{VAD}$. The following is an explanation of learning of the first neural network NN1, the second neural network NN2, the third neural network NN3, the fourth neural network NN4, the fifth neural network NN5, and the sixth neural network NN6, with reference to FIG. 6 and FIG. 7.

As illustrated in FIG. 6 and FIG. 7, the input signal acquisition unit 211 acquires an input signal including an acoustic signal A and an image signal V (Step SB1). At Step SB1, an input signal serving as a training sample is acquired. The frame length of the time sections of the input signal is not particularly limited, but is supposed to be, for example, 10 frames or around. The acoustic signal A and the image signal V included in the input signal are temporally synchronized with each other.

When Step SB1 is executed, the acoustic feature calculation unit 212 calculates an acoustic feature $E_A$ from the acoustic signal A acquired at Step SB1, using the first neural network (Step SB2). Learning of the first neural network at Step SB2 is not finished. The acoustic signal A input to the first neural network NN1 has been converted from the time region into the frequency region.

When Step SB2 is executed, the non-acoustic feature calculation unit 213 calculates an image feature $E_V$ from the image signal V acquired at Step SB1, using the second neural network (Step SB3). Learning of the second neural network at Step SB3 is not finished.

The order of Step SB2 and Step SB3 is not particularly limited. Step SB2 may be executed after Step SB3, or Step SB2 and Step SB3 may be executed in parallel.

When Step SB3 is executed, the integrated feature calculation unit 214 calculates an integrated feature $Z_{AV}$ of the acoustic feature $E_A$ and the non-acoustic feature $E_V$ using the integrated feature calculation module NM1 (Step SB4). At Step SB4, the integrated feature calculation unit 214 calculates an integrated feature $Z_{AV}$ of the acoustic feature $E_A$ and the non-acoustic feature $E_V$. The integrated feature $Z_{AV}$ is calculated for each frame time t.

When Step SB4 is executed, the voice emphasized feature calculation unit 215 calculates a voice emphasized feature $E_{SE}$ from the integrated feature $Z_{AV}$ calculated at Step SB4, using the third neural network NN3 (Step SB5). Learning of the third neural network at Step SB5 is not finished.

When Step SB5 is executed, the voice existence/non-existence feature calculation unit 216 calculates a voice existence/non-existence feature $E_{VAD}$ from the integrated feature $Z_{AV}$ calculated at Step SB4, using the fourth neural network NN4 (Step SB6). Learning of the fourth neural network at Step SB6 is not finished.

The order of Step SB5 and Step SB6 is not particularly limited. Step SB5 may be executed after Step SB6, or Step SB5 and Step SB6 may be executed in parallel.

When Step SB6 is executed, the voice emphasized signal calculation unit 217 calculates a voice emphasized signal $\hat{Y}_{SE}$ from the voice emphasized feature $E_{SE}$ calculated at Step SB5 and the voice existence/non-existence feature $E_{VAD}$ calculated at Step SB6, using the fifth neural network NN5 (Step SB7).

When Step SB7 is executed, the voice existence score calculation unit 218 calculates a voice existence score $\hat{Y}_{VAD}$, from the voice emphasized feature $E_{SE}$ calculated at Step SB5 and the voice existence/non-existence feature $E_{VAD}$ calculated at Step SB6, using the sixth neural network NN6 (Step SB8).

When Step SB7 is executed, the update unit 219 updates the first neural network NN1, the second neural network NN2, the third neural network NN3, the fourth neural network NN4, the fifth neural network NN5, and the sixth neural network NN6 using the total loss function including the first loss function, the second loss function, and the third loss function (Step SB8). As expressed with the following expression (5), the total loss function $L_{TOTAL}$ at the frame time t and the coordinates d is defined by a sum of the first loss function $L_{KLD}$, the second loss function $L_{SDR}$, and the third loss function $L_{BCE}$.

$$\mathcal{L}_{total}^{(t)} = \mathcal{L}_{KLD}^{(t)}(E_A^{(t,:)}) + \mathcal{L}_{SDR}^{(t)}(Y_{SE}^{(t,:)}, \hat{Y}_{SE}^{(t,:)}) + \mathcal{L}_{BCE}^{(t)}(Y_{VAD}^{(t,:)}, \hat{Y}_{VAD}^{(t,:)}) \quad (5)$$

The first loss function $L_{KLD}$ is a loss function to provide a penalty for a difference between the acoustic feature and the non-acoustic feature relating to the same voice generation source. Specifically, the first loss function $L_{KLD}$ is provided by the Kullback-Leibler divergence based on the acoustic feature $E_A$ and the image feature $E_V$, as expressed with the following expression (6). The Kullback-Leibler divergence is used as a scale to evaluate a difference between the acoustic feature $E_A$ and the image feature $E_V$. The second loss function $L_{SDR}$ is a loss function to provide a penalty for a difference between the correct voice signal and the voice emphasized signal. As expressed with the following expressions (7) and (8), the second loss function $L_{SDR}$ is provided by a signal-to-distortion ratio (SDR). The signal-to-distortion ratio is used as a scale to evaluate a difference between the correct voice signal $Y_{SE}$ and the voice emphasized signal $\hat{Y}_{SE}$. The third loss function $L_{BCE}$ is a loss function to provide a penalty for a difference between the correct label for the voice section and the non-voice section and the voice existence score. As expressed with the following expression (9), the third loss function $L_{BCE}$ is provided by binary cross entropy (BCE). Binary cross entropy is used as a scale to evaluate a difference between a correct label $Y_{VAD}$ and the voice existence score $\hat{Y}_{VAD}$.

$$\mathcal{L}_{KLD}^{(t)}\left(E_A^{(t,:)} \| E_V^{(t,:)}\right) = \sum_{d=1}^{D} E_A^{(t,d)} \cdot \log\left(\frac{E_A^{(t,d)}}{E_V^{(t,d)}}\right) \quad (6)$$

$$\mathcal{L}_{SDR}^{(t)}\left(Y_{SE}^{(t,:)}, \hat{Y}_{SE}^{(t,:)}\right) = -10 \cdot \log_{10}\left(\frac{\|\alpha \cdot Y_{SE}^{(t,:)}\|_2}{\|\alpha \cdot Y_{SE}^{(t,:)} - \hat{Y}_{SE}^{(t,:)}\|_2}\right) \quad (7)$$

$$\alpha = \frac{(\hat{Y}_{SE}^{(t,:)})^T \cdot Y_{SE}^{(t,:)}}{\|Y_{SE}^{(t,:)}\|_2} = \operatorname*{argmin}_{a} \|\alpha \cdot Y_{SE}^{(t,:)} - \hat{Y}_{SE}^{(t,:)}\|_2 \quad (8)$$

$$\mathcal{L}_{BCE}^{(t)}\left(Y_{VAD}^{(t,:)}, \hat{Y}_{VAD}^{(t,:)}\right) = -\sum_{k=1}^{K=2} Y_{VAD}^{(t,k)} \cdot \log(\hat{Y}_{VAD}^{(t,k)}) \quad (9)$$

The update unit 219 updates learning parameters of the first neural network NN1, the second neural network NN2, the third neural network NN3, the fourth neural network NN4, the fifth neural network NN5, and the sixth neural network NN6 to minimize the total loss function $L_{TOTAL}$, in accordance with a desired optimization method. In this manner, the update unit 219 updates the learning parameters of the first neural network NN1, the second neural network NN2, the third neural network NN3, the fourth neural network NN4, the fifth neural network NN5, and the sixth neural network NN6 to minimize a difference between the acoustic feature $E_A$ and the image feature $E_V$, a difference between the correct voice signal $Y_{SE}$ and the voice emphasized signal $\hat{Y}_{SE}$, and a difference between the correct label $Y_{VAD}$ and the voice existence score $\hat{Y}_{VAD}$ comprehensively.

Any method, such as a stochastic gradient descent and adaptive moment estimation (Adam), may be used as the optimization method.

When Step SB8 is executed, the update completion determination unit 220 determines whether the stop condition is satisfied (Step SB9). The stop condition may be, for example, a condition that the number of updates of the learning parameters has reached a predetermined number of times and/or a condition that the update quantity of the learning parameters is less than the threshold. When it is determined that the stop condition is not satisfied (Step SB9: NO), the input signal acquisition unit 211 acquires another acoustic signal and another image signal (Step SB1). Thereafter, the acoustic signal and the image signal is successively subjected to calculation of the acoustic feature with the acoustic feature calculation unit 212 (Step SB2), calculation of the non-acoustic feature with the non-acoustic feature calculation unit 213 (Step SB3), calculation of the integrated feature with the integrated feature calculation unit 214 (Step SB4), calculation of the voice emphasized feature with the voice emphasized feature calculation unit 215 (Step SB5), calculation of the voice existence/non-existence feature with the voice existence/non-existence feature calculation unit 216 (Step SB6), calculation of the voice emphasized signal with the voice emphasized signal calculation unit 217 (Step SB7), calculation of the voice existence score with the voice existence score calculation unit 218 (Step SB8), update of the first neural network, the second neural network, the third neural network, the fourth neural network, the fifth neural network, and the sixth neural network with the update unit 219 (Step SB9), and determination with the update completion determination unit 220 as to whether the stop condition is satisfied (Step SB10).

Steps SB2 to SB9 may be repeated for a training sample (batch learning), or Steps SB2 to SB9 may be repeated for a plurality of training samples (mini-batch learning).

When it is determined at Step SB10 that the stop condition is satisfied (Step SB10: YES), the update completion determination unit 220 outputs the first neural network NN1 at the time when the stop condition is satisfied as the first trained model, the second neural network NN2 at the time when the stop condition is satisfied as the second trained model, the third neural network NN3 at the time when the stop condition is satisfied as the third trained model, the fourth neural network NN4 at the time when the stop condition is satisfied as the fourth trained model, the fifth neural network NN5 at the time when the stop condition is satisfied as the fifth trained model, and the sixth neural network NN6 at the time when the stop condition is satisfied as the sixth trained model (Step SB11). The first trained model, the second trained model, the third trained model, the fourth trained model, the fifth trained model, and the sixth trained model are transmitted to the voice activity detection apparatus 100 via the communication device 24 or the like, and stored in the storage device 12. The update completion determination unit 220 may output an integrated neural network including the first trained model, the second trained model, the third trained model, the fourth trained model, the fifth trained model, the sixth trained model, and the integrated feature calculation module NM1.

When the step SB10 is executed, learning processing with the processing circuit 21 is finished. As described above, the voice activity detection apparatus 100 calculates a voice existence score from the acoustic signal and the image signal using the first trained model, the second trained model, the third trained model, the fourth trained model, the fifth trained model, and the sixth trained model generated with the learning apparatus 200. The voice activity detection apparatus 100 may calculate a voice existence score by inputting the acoustic signal and the image signal to the integrated neural network.

As described above, the learning apparatus 200 according to the present embodiment includes the input signal acquisition unit 211, the acoustic feature calculation unit 212, the non-acoustic feature calculation unit 213, the integrated feature calculation unit 214, the voice emphasized feature calculation unit 215, the voice existence/non-existence feature calculation unit 216, the voice emphasized signal calculation unit 217, the voice existence score calculation unit 218, and the update unit 219. The input signal acquisition unit 211 acquires an acoustic signal and a non-acoustic signal relating to the same voice generation source. The acoustic feature calculation unit 212 calculates an acoustic feature from the acoustic signal using the first neural network. The non-acoustic feature calculation unit 213 calculates a non-acoustic feature from the non-acoustic signal using the second neural network. The integrated feature calculation unit 214 calculates an integrated feature of the acoustic feature and the non-acoustic feature. The voice emphasized feature calculation unit 215 calculates a voice emphasized feature from the integrated feature using the third neural network. The voice existence/non-existence feature calculation unit 216 calculates a voice existence/non-existence feature from the integrated feature using the fourth neural network. The voice emphasized signal calculation unit 217 calculates a voice emphasized signal from the voice emphasized feature and the voice existence/non-existence feature using the fifth neural network. The voice existence score calculation unit 218 calculates a voice existence score from the voice emphasized feature and the voice existence/non-existence feature using the sixth neural network. The update unit 219 updates the first neural network, the second neural network, the third neural network, the fourth neural network, the fifth neural network, and the sixth neural network using a total loss function including a first loss function relating to a difference between the acoustic feature and the non-acoustic feature, a second loss function relating to a difference between a correct voice signal and the voice emphasized signal, and a third loss function relating to a difference between a correct label and the voice existence score.

The structure described above enables generation of an integrated neural network of the first trained model, the second trained model, the third trained model, the fourth trained model, the fifth trained model, and the sixth trained model serving as voice section detection models with high accuracy, by multitask learning of the voice section detection task and the voice emphasis task. A voice existence score resistant to noise is calculated from the voice existence/non-existence feature acquired using the third trained model and the voice emphasized feature acquired using the fourth trained model. Consequently, this structure enables detection of voice sections with high accuracy even in various noise environments. Although the voice section detection task and the voice emphasis task are independent processing tasks having different outputs, in common weight update of the network with a voice feature quantity having increasing importance in noise environments, the optimization problem with joint learning with voice emphasis processing and an attention mechanism promoting the effect thereof is restricted as inductive bias in voice activity detection processing. Consequently, multitask learning of the voice section detection task and the voice emphasis task contributes to improvement in detection accuracy for voice sections.

Verification Example

Verification was executed for the performance of the integrated neural network (hereinafter referred to as "proposed model") according to the present embodiment and including the first neural network, the second neural network, the third neural network, the fourth neural network, the fifth neural network, and the sixth neural network generated by the embodiment described above. An audio-only model (A-only), a baseline model (AV-baseline), and the proposed model were trained and evaluated using a GRID-AV sentence corpus (hereinafter simply referred to as "GRID corpus") formed of AV recording of 1000 sentences spoken by each of 34 speakers (18 men and 16 women). The A-only model is a voice section detection model using only an acoustic signal without using a non-acoustic signal. The baseline model is a voice section detection model using neither voice emphasized feature nor voice existence feature.

For learning of the models in consideration of noise, background noises provided in the 4th CHiME challenge were selected at random, and mixed into all acoustic training data of the GRID corpus having a SNR falling within a range of −5 to +20 dB. The noises of the CHiME 4 were recorded in four places, that is, the bus, the cafeteria, the pedestrian area, and the street intersection. To evaluate the performance under noise conditions, the noises of the CHiME 4 were mixed into all test acoustic records of the GRID corpus at 5 dB intervals with the SNR in a range of −10 to +20 dB.

Records of each of the speakers of the GRID corpus were divided into a training data set, a verification data set, and a test data set at a rate of 6:2:2. The verification data set was used to specify a hyperparameter suitable for each model and each experiment condition. With respect to the input voice, all the voice records were subjected to resampling at a sampling rate of 16 kHz, and 641-dimensional spectrogram was calculated using short-time Fourier transform having a window size of 1,280 samples (80 milliseconds) and a hop length of 640 samples (40 milliseconds). With respect to the input image, all the image records are cut into lip areas using a face landmark detector of 68 coordinates, and converted into 25 frames/seconds (40 milliseconds) with resolution of H×W=40×64 pixels, and the RGB channels were normalized between 0 to 1. All the models were trained by gradient clipping using Adam optimization. The learning rate was initialized to 0.0001, and the batch size was set to 1.

FIG. 8 is a table illustrating verification results using a data set of CHiME4. FIG. 8 uses an area under the receiver operating characteristic (AUROC) as an index of quantitative performance evaluation of AV-VAD. FIG. 8 illustrates evaluation results for all the models. The bold-type characters indicate the best values.

The proposed model (AV-proposed) presented values markedly higher than those of the baseline model (AV-baseline) in all the experiment conditions, and presented relative improvement of 4.36% (SNR of −5 dB) at maximum and 2.09% on average (Average). In addition, the proposed model presented relative improvement of 16.41% (SNR of −10 dB) at maximum and 4.62% on average (Average) in comparison with the Audio-only model (A-only).

The embodiment described above is an example, and various modifications are possible. For example, the acoustic signal is a voice signal in the embodiment, but may be a vocal cord signal or a vocal tract signal acquired by decomposing the voice signal. In addition, the acoustic signal is waveform data of sound pressure values in the time region or the frequency region in the embodiment, but may be data acquired by converting the waveform data into any space.

Accordingly, the embodiment described above enables further improvement in detection accuracy for the voice section and/or the non-voice section even in the case where various types of noise exist.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice activity detection apparatus comprising a processing circuit, the processing circuit executing:

acquiring an acoustic signal and a non-acoustic signal relating to a voice generation source, the non-acoustic signal being an image signal relating to person who corresponds to the voice generation source or a sensor signal relating to physiological response of lips or a face muscle or brain waves of the person, the non-acoustic signal being a signal that depends on a lip area having a form that is changed in accordance with utterance of the voice generation source;

calculating an acoustic feature based on the acoustic signal using a first trained model;

calculating a face-dependent non-acoustic feature based on the non-acoustic signal using a second trained model;

calculating an integrated feature based on the acoustic feature and the non-acoustic feature;

calculating a voice emphasized feature based on the integrated feature using a third trained model, the voice emphasized feature being a reconstructed voice signal acquired by separating and emphasizing only a voice signal by the voice generation source from the acoustic signal;

calculating a voice existence/non-existence feature based on the integrated feature using a fourth trained model, the voice existence/non-existence feature having a value indicating existence/non-existence of the voice signal by the voice generation source from the acoustic signal;

calculating a voice emphasized signal based on the voice emphasized feature and the voice existence/non-existence feature using a fifth trained model;

calculating a voice existence score based on the voice emphasized feature and the voice existence/non-existence feature using a sixth trained model, the voice existence score being a scale to distinguish between a voice section and a non-voice section, the voice section being a time section in which voice is present, the non-voice section being a time section in which voice is absent; and detecting a voice section and/or a non-voice section based on comparison of the voice existence score with a threshold, wherein:
the first trained model and the second trained model are generated by learning to reduce a first loss relating to a difference between the acoustic feature and the non-acoustic feature relating to the voice generation source,
the third trained model and the fifth trained model are generated by learning to reduce a second loss relating to a difference between a correct voice signal for a voice signal included in the acoustic signal and the voice emphasized signal, and
the fourth trained model and the sixth trained model are generated by learning to reduce a third loss relating to a difference between a correct label relating to the voice section and the non-voice section and the voice existence score, and
wherein the first trained model, the second trained model, the third trained model, the fourth trained model, the fifth trained model, and the sixth trained model are neural network models.

2. The voice activity detection apparatus according to claim 1, wherein the first trained model, the second trained model, the third trained model, the fourth trained model, the fifth trained model, and the sixth trained model are simultaneously generated as a whole by learning to reduce an integrated loss of the first loss, the second loss, and the third loss.

3. The voice activity detection apparatus according to claim 1, wherein the non-acoustic signal is an image signal temporally synchronized with the acoustic signal.

4. A learning apparatus comprising a processing circuit, the processing circuit executing:
acquiring an acoustic signal and a non-acoustic signal relating to a voice generation source, the non-acoustic signal being an image signal relating to a person who corresponds to the voice generation source or a sensor signal relating to a physiological response of lips or a face muscle, or brain waves of the person the non-acoustic signal being a signal that depends on a lip area having a form that is changed in accordance with utterance of the voice generation source;
calculating an acoustic feature from the acoustic signal using a first neural network;
calculating a face-dependent non-acoustic feature from the non-acoustic signal using a second neural network;
calculating an integrated feature based on the acoustic feature and the non-acoustic feature;
calculating a voice emphasized feature from the integrated feature using a third neural network, the voice emphasized feature being a reconstructed voice signal acquired by separating and emphasizing only a voice signal by the voice generation source from the acoustic signal;
calculating a voice existence/non-existence feature from the integrated feature using a fourth neural network, the voice existence/non-existence feature having a value indicating existence/non-existence of the voice signal by the voice generation source from the acoustic signal;
calculating a voice emphasized signal from the voice emphasized feature and the voice existence/non-existence feature using a fifth neural network;
calculating a voice existence score from the voice emphasized feature and the voice existence/non-existence feature using a sixth neural network, the voice existence score being a scale to distinguish between a voice section and a non-voice section, the voice section being a time section in which voice is present, the non-voice section being a time section in which voice is absent; and
updating the first neural network, the second neural network, the third neural network, the fourth neural network, the fifth neural network, and the sixth neural network by reducing a total loss function including a first loss function, a second loss function, and a third loss function,
the first loss function relating to a difference between the acoustic feature and the non-acoustic feature;
the second loss function relating to a difference between a correct voice signal relating to a voice signal included in the acoustic signal and the voice emphasized signal,
the third loss function relating to a difference between a correct label relating to a voice section and a non-voice section and the voice existence score.

5. A non-transitory computer-readable medium including computer-executable instructions, wherein the instructions, when executed by a processor, cause the processor to perform operations comprising:
calculating an acoustic feature based on an acoustic signal using a first trained model;
calculating a non-acoustic face-dependent feature based on a non-acoustic signal using a second trained model, the non-acoustic signal being acquired from a same generation source as the acoustic signal, the non-acoustic signal being an image signal relating to a person who corresponds to the voice generation source or a sensor signal relating to physiological response of lips or a face muscle, or brain waves of the person, the non-acoustic signal being a signal that depends on a lip area having a form that is changed in accordance with utterance of the voice generation source;
calculating an integrated feature based on the acoustic feature and the face-dependent non-acoustic feature;
calculating a voice emphasized feature based on the integrated feature using a third trained model, the voice emphasized feature being a reconstructed voice signal acquired by separating and emphasizing only a voice signal by the voice generation source from the acoustic signal;
calculating a voice existence/non-existence feature based on the integrated feature using fourth trained model, the voice existence/non-existence feature having a value indicating existence/non-existence of the voice signal by the voice generation source from the acoustic signal;
calculating a voice emphasized signal based on the voice emphasized feature and the voice existence/non-existence feature using a fifth trained model;
calculating a voice existence score based on the voice emphasized feature and the voice existence/non-existence feature using a sixth trained model, the voice existence score being a scale to distinguish between a voice section and anon-voice section, the voice section being a time section in which voice is present, the non-voice section being a time section in which voice is absent; and
detecting a voice section and/or a non-voice section based on comparison of the voice existence score with a threshold,
wherein:
the first trained model and the second trained model are generated by learning to reduce a first loss relating to a difference between the acoustic feature and the non-acoustic feature relating to the voice generation source, the third trained model and the fifth trained model are generated by learning to reduce a second loss relating to a difference between a correct voice signal for a voice signal included in the acoustic signal and the voice emphasized signal, and
the fourth trained model and the sixth trained model are generated by learning to reduce a third loss relating to a difference between a correct label relating to the voice section and the non-voice section and the voice existence score, and
wherein the first trained model, the second trained model, the third trained model, the fourth trained model, the fifth trained model, and the sixth trained model are neural network models.

* * * * *